US012560099B2

(12) United States Patent
Beguin et al.

(10) Patent No.: US 12,560,099 B2
(45) Date of Patent: Feb. 24, 2026

(54) TURBINE FOR TURBOMACHINE

(71) Applicant: SAFRAN AIRCRAFT ENGINES, Paris (FR)

(72) Inventors: Anthony Pierre Beguin, Moissy-Cramayel (FR); Olivier Jean-Daniel Baumas, Moissy-Cramayel (FR); Nicolas Daniel Delaporte, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 19/211,604

(22) Filed: May 19, 2025

(65) Prior Publication Data

US 2025/0277457 A1 Sep. 4, 2025

Related U.S. Application Data

(63) Continuation of application No. 18/714,243, filed as application No. PCT/FR2022/052239 on Dec. 2, 2022, now Pat. No. 12,331,650.

(30) Foreign Application Priority Data

Dec. 3, 2021 (FR) ....................................... 2112911

(51) Int. Cl.
*F01D 25/14* (2006.01)
*F01D 9/04* (2006.01)
*F01D 25/24* (2006.01)

(52) U.S. Cl.
CPC ............. *F01D 25/14* (2013.01); *F01D 9/041* (2013.01); *F01D 25/243* (2013.01);
(Continued)

(58) Field of Classification Search
CPC ........ F01D 25/14; F01D 9/041; F01D 25/243; F01D 25/246; F05D 2240/80; F05D 2240/81
See application file for complete search history.

(56) References Cited

U.S. PATENT DOCUMENTS 7,186,078 B2 * 3/2007 Tanaka .................. F01D 11/005 415/173.1
7,972,107 B2 * 7/2011 Dervaux ................... F01D 9/06 415/115
(Continued)

FOREIGN PATENT DOCUMENTS

EP 1 384 858 A2 1/2004
FR 2 899 281 A1 10/2007
(Continued)

OTHER PUBLICATIONS

International Search Report mailed Feb. 10, 2023, issued in corresponding International Application No. PCT/FR2022/052239, filed Dec. 2, 2022, 6 pages.
(Continued)

*Primary Examiner* — Eldon T Brockman
(74) *Attorney, Agent, or Firm* — CHRISTENSEN O'CONNOR JOHNSON KINDNESS PLLC

(57) ABSTRACT

An assembly for a turbomachine of longitudinal axis includes a nozzle carried by an annular part which is fixed to an outer casing. The nozzle has an outer annular platform from which extends, radially outwards, a radial annular wall which carries an annular attachment tab extending longitudinally upstream from the radial annular wall. The assembly has a cooling circuit with an inner annular chamber delimited radially by the outer annular platform and the annular part and delimited downstream by the radial annular wall. An intermediate annular chamber is formed radially externally to the annular attachment tab and in fluid communi-
(Continued)

cation with the outer casing. Means of fluid communication between the inner annular chamber and the intermediate annular chamber is formed in the annular attachment tab of the nozzle.

17 Claims, 5 Drawing Sheets

(52) U.S. Cl.
CPC ........ *F01D 25/246* (2013.01); *F05D 2240/80* (2013.01); *F05D 2240/81* (2013.01)

(56) References Cited

U.S. PATENT DOCUMENTS

| | | | | |
|---|---|---|---|---|
| 8,100,644 | B2 * | 1/2012 | Hazevis | F01D 11/005 415/173.1 |
| 8,858,169 | B2 | 10/2014 | Dakowski et al. | |
| 10,704,419 | B2 * | 7/2020 | Bassery | F01D 9/041 |
| 2005/0002779 | A1 * | 1/2005 | Tanaka | F01D 5/225 415/173.1 |
| 2007/0231123 | A1 * | 10/2007 | Dervaux | F01D 9/06 415/115 |
| 2009/0129917 | A1 * | 5/2009 | Hazevis | F01D 11/005 415/173.1 |
| 2011/0229314 | A1 | 9/2011 | Dakowski et al. | |

FOREIGN PATENT DOCUMENTS

| | | | |
|---|---|---|---|
| FR | 2 923 525 | A1 | 5/2009 |
| FR | 3 000 985 | A1 | 7/2014 |
| FR | 3 066 225 | A1 | 11/2018 |

OTHER PUBLICATIONS

Written Opinion mailed Feb. 10, 2023, issued in corresponding International Application No. PCT/FR2022/052239, filed Dec. 2, 2022, 7 pages.

* cited by examiner

TURBINE FOR TURBOMACHINE

CROSS-REFERENCES TO RELATED APPLICATIONS

This patent application is a continuation of U.S. patent application Ser. No. 18/714,243, filed May 29, 2024, which is a National Stage entry of International Application No. PCT/FR2022/052239, filed Dec. 2, 2022, which claims the benefit of French Patent Application No. FR2112911, filed Dec. 3, 2021, the entire disclosures of which are hereby incorporated by reference in their entirety for all purposes.

FIELD OF THE DISCLOSURE

This description relates to an assembly for a turbomachine, in particular in an aircraft turbojet or in an aircraft turboprop engine. It also relates to a turbine for a turbomachine comprising such an assembly and to a turbomachine comprising such a turbine.

BACKGROUND

Conventionally, as described in document FR 2 899 281, a turbomachine of longitudinal axis X represented in FIG. 1 comprises, from upstream to downstream in the direction of the gas flow within the turbomachine, a fan, a compressor, a combustion chamber 11, a turbine 10, and an exhaust nozzle. Turbine 10 generally comprises a high-pressure turbine 12 and a low-pressure turbine 14.

Turbine 10 comprises several stages, each having a nozzle guide vane assembly 40 (hereinafter referred to as "nozzle") fixed to a casing of the turbine and an annular row of moving blades 50 arranged downstream, inside a ring 51. Nozzle 40 generally comprises an inner platform and an outer annular platform 42 with an annular row of fixed vanes 43 extending between them. Inner annular platform 41 and outer annular platform 42 radially define a flow path for the gases in the turbine.

FIG. 2 shows part of the first stage or upstream stage of low-pressure turbine 14, in more detail. Upstream nozzle 40, i.e. nozzle 40 of the first stage or upstream stage of low-pressure turbine 14, is carried by an annular part 30 which is fixed to a radial annular flange 21 of outer casing 20. In particular, nozzle 40 comprises, downstream, a radial annular wall 44 extending radially outwards from outer annular platform 42 and an annular attachment tab 45 extending longitudinally upstream from outer annular platform 42 and clamped radially between two cylindrical walls of annular part 30. Furthermore, ring 51 of the upstream stage of low-pressure turbine 14 is carried, upstream, by outer casing 20 of low-pressure turbine 14 by means of an annular tab 52 resting radially against a cylindrical rail 22 of the casing, annular tab 52 and cylindrical rail 22 being held together by an annular attachment member 23.

The vanes of upstream nozzle 40 of low-pressure turbine 14 are subjected to high temperatures. Cooling air is therefore bled upstream by the turbomachine compressor and conveyed via ducts to internal cavities formed in the vanes of upstream nozzle 40. Similarly, annular tab 52 of ring 51, cylindrical rail 22 of outer casing 20, and the annular attachment member are subjected to high temperatures. To remedy this, outer annular platform 42 has holes which allow bringing cooling air from the internal cavities of the vanes to a first annular chamber 61 delimited radially between outer annular platform 42 and annular part 30. Radial annular wall 44 of the nozzle 40 also comprises holes 65 which allow bringing cooling air from first annular chamber 61 to a second annular chamber 63, downstream, which is delimited radially between annular attachment member 23 and ring 51.

However, it has been observed that outer casing 20 is also subjected to high temperatures resulting in premature wear, and that the current solution does not allow cooling outer casing 20.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In a first configuration, an assembly is proposed for a turbomachine of longitudinal axis, the assembly comprising a nozzle carried by an annular part which is fixed to an outer casing surrounding an annular row of moving blades arranged downstream of the nozzle, the nozzle comprising an outer annular platform from which extends, radially outwards, a radial annular wall which carries an annular attachment tab for hooking the nozzle on the annular part, the annular attachment tab extending longitudinally upstream from the radial annular wall, the assembly further comprising a cooling circuit which comprises an inner annular chamber delimited radially by the outer annular platform and the annular part and delimited downstream by the radial annular wall, an intermediate annular chamber formed radially externally to the annular attachment tab and in fluid communication with the outer casing, and means of fluid communication between the inner annular chamber and the intermediate annular chamber, the means being formed in the annular attachment tab of the nozzle.

Cold air can thus circulate in the cooling circuit from the inner annular chamber to the intermediate annular chamber. Because the intermediate annular chamber is in fluid communication with the outer casing, the latter is then cooled by cold air. Wear of the outer casing due to high temperatures is thus reduced or even avoided.

In a second configuration, which may be independent of or taken in combination with the first configuration, an assembly is proposed for a turbomachine of longitudinal axis, the assembly comprising a nozzle carried by an annular part which is fixed to an outer casing surrounding an annular row of moving blades arranged downstream of the nozzle, the nozzle comprising an outer annular platform from which a radial annular wall extends radially outwards, the annular part comprising a first wall extending in a direction comprising at least one radial component and an outer cylindrical wall extending longitudinally downstream from the first wall, the assembly further comprising a cooling circuit which comprises an intermediate annular chamber and an outer annular chamber each delimited longitudinally between the first wall of the annular part and the radial annular wall of the nozzle, the outer annular chamber being formed radially externally to the intermediate annular chamber, the outer cylindrical wall forming a partition radially between the outer annular chamber and the intermediate annular chamber, the outer annular chamber being further delimited, radially externally, by the outer casing, the cooling circuit comprising means of fluid communication between the intermediate annular chamber and the outer annular chamber.

Cold air can thus circulate in the cooling circuit from the intermediate annular chamber to the outer annular chamber. The outer annular chamber being delimited radially externally by the outer casing, this casing is then in contact with the cold air conveyed into the outer annular chamber. As a result, the outer casing is cooled by the cold air. Wear of the outer casing due to high temperatures is thus reduced or even avoided.

The assembly according to the first configuration and/or the second configuration may comprise one or more of the following features, taken independently or in combination.

The nozzle may comprise an inner annular platform. The inner annular platform and the outer annular platform may radially define a flow path for gases in the turbine. The nozzle may comprise an annular row of fixed vanes extending radially between the outer annular platform and the inner annular platform.

The means of fluid communication between the inner annular chamber and the intermediate annular chamber, the means being formed in the annular attachment tab of the nozzle, may comprise a plurality of holes formed through the annular attachment tab.

Each of the holes formed through the annular attachment tab may extend in a direction contained in a respective radial plane. This allows cold air to circulate between the inner annular chamber and the intermediate annular chamber along the shortest path.

The holes formed through the annular attachment tab may be regularly distributed around the longitudinal axis. This allows regular distribution of the flow of cold air circulating between the inner annular chamber and the intermediate annular chamber, thus improving the cooling of the outer casing.

The annular part may comprise an inner cylindrical wall and an intermediate cylindrical wall, the inner cylindrical wall being entirely or partly surrounded by the intermediate cylindrical wall, an upstream end portion of the annular attachment tab being clamped radially between the inner cylindrical wall and the intermediate cylindrical wall of the annular part.

Each hole is in communication, radially internally, with an annular space formed longitudinally between a downstream end of the inner cylindrical wall of the annular part and the radial annular wall of the nozzle, and radially externally with an annular space formed longitudinally between a downstream end of the intermediate cylindrical wall of the annular part and the radial annular wall of the nozzle. Thus, the means of fluid communication between the inner annular chamber and the intermediate annular chamber are without any holes through the inner cylindrical wall and the intermediate cylindrical wall of the annular part.

The outer cylindrical wall of the annular part may rest, in the longitudinal direction, against an upstream face of the radial annular wall of the nozzle, the means of fluid communication between the intermediate annular chamber and the outer annular chamber comprising a plurality of upstream grooves of a first type formed on the upstream face of the radial annular wall, each upstream groove of the first type extending radially from an inner annular portion of the upstream face of the radial annular wall which delimits the intermediate annular chamber, to an outer annular portion of the upstream face of the radial annular wall which delimits the outer annular chamber.

The outer cylindrical wall of the annular part and the radial annular wall of the nozzle resting against each other in the longitudinal direction allows restricting the movement of the nozzle relative to the annular part in the longitudinal direction. Each upstream groove of the first type thus allows cold air to circulate between the intermediate annular chamber and the outer annular chamber.

Each upstream groove of the first type may lead radially outwards to a radially outer end of the radial annular wall. In other words, a radially inner end of each upstream groove of the first type is located on the upstream face of the radial annular wall, radially at the intermediate annular chamber, and a radially outer end of each upstream groove of the first type is located on the upstream face of the radial annular wall, radially at the outer annular chamber.

Each upstream groove of the first type may have a rounded bottom. In particular, each upstream groove of the first type may have a crescent-shaped cross-section. Alternatively, each upstream groove of the first type may have a flat bottom. Each upstream groove of the first type extends rectilinearly in a radial direction. This allows cold air to circulate between the intermediate annular chamber and the outer annular chamber along the shortest path.

The annular row of moving blades may be surrounded by a ring carried by the outer casing, the ring being fixed, upstream, to the outer casing by means of an annular tab resting radially against a cylindrical rail of the outer casing, the annular tab and the cylindrical rail being held together by an annular attachment member, the cooling circuit comprising a downstream annular chamber delimited radially between the ring and the annular attachment member and delimited longitudinally between the radial annular wall of the nozzle and the annular tab of the ring, and means of fluid communication between the intermediate annular chamber and the downstream annular chamber.

Cold air can thus circulate in the cooling circuit from the intermediate annular chamber to the downstream annular chamber, making it possible to cool the annular tab of the ring, the cylindrical rail of the outer casing, and the annular attachment member. The annular attachment member may have a C- or U-shaped cross-section. The ring may bear an abradable material on its radially inner face.

The means of fluid communication between the intermediate annular chamber and the downstream annular chamber may comprise indirect means of fluid communication between the intermediate annular chamber and the downstream annular chamber, via the outer annular chamber, the indirect means of fluid communication between the intermediate annular chamber and the downstream annular chamber comprising the means of fluid communication between the intermediate annular chamber and the outer annular chamber.

The cold air is conveyed to the downstream annular chamber in order to cool the annular tab of the ring, the cylindrical rail of the outer casing, and the annular attachment member, while circulating in the outer annular chamber which allows the passage of cold air to cool the outer casing because this casing delimits, radially externally, the outer annular chamber. The indirect means of fluid communication between the intermediate annular chamber and the downstream annular chamber may comprise means of fluid communication between the outer annular chamber and the downstream annular chamber.

The means of fluid communication between the outer annular chamber and the downstream annular chamber may comprise a first radial clearance formed between a radially outer end of the radial annular wall of the nozzle and the outer casing. This first radial clearance allows the cold air contained in the outer annular chamber to circulate from upstream to downstream relative to the radial annular wall of the nozzle.

The annular attachment member may rest, in the longitudinal direction, against an intermediate annular portion of a downstream face of the radial annular wall of the nozzle, the means of fluid communication between the outer annular chamber and the downstream annular chamber comprising a plurality of downstream grooves of a first type formed on the downstream face of the radial annular wall, each downstream groove of the first type extending radially from an inner annular portion of the downstream face of the radial annular wall which delimits the downstream annular chamber to an outer annular portion of the downstream face of the radial annular wall which is located radially externally to the intermediate annular portion of the downstream face of the radial annular wall.

Each downstream groove of the first type allows cold air to circulate radially inwards towards the downstream annular chamber despite the annular attachment member and the downstream face of the radial annular wall resting against each other longitudinally and annularly. Each downstream groove of the first type may have a rounded bottom. In particular, each downstream groove of the first type may have a crescent-shaped cross-section. Alternatively, each downstream groove of the first type may have a flat bottom.

Each downstream groove of the first type may extend rectilinearly in a radial direction. This allows cold air to circulate between the outer annular chamber and the downstream annular chamber along the shortest path. The radial direction of extension of each downstream groove of the first type may be angularly coincident, around the longitudinal axis, with the radial direction of extension of one of the upstream grooves of the first type. In other words, the upstream grooves of the first type and the downstream grooves of the first type may be formed as pairs of opposites, respectively on the upstream and downstream faces of the radial annular wall of the nozzle.

The means of fluid communication between the intermediate annular chamber and the downstream annular chamber may comprise direct means of fluid communication between the intermediate annular chamber and the downstream annular chamber. Cold air is conveyed directly from the intermediate annular chamber to the downstream annular chamber, thus improving the cooling of the annular tab of the ring, the cylindrical rail of the outer casing, and the annular attachment member.

The radial annular wall of the nozzle may comprise a plurality of notches distributed circumferentially around the longitudinal axis and open radially outwards at a radially outer end of the radial annular wall, in which are engaged parts projecting from the outer cylindrical wall of the annular part, the direct means of fluid communication between the intermediate annular chamber and the downstream annular chamber comprising a second radial clearance formed between a bottom face of each notch and the corresponding part projecting from the annular part.

The cooperation between the notches of the radial annular wall of the nozzle and the parts projecting from the outer cylindrical wall of the annular part makes it possible to restrict movement of the nozzle relative to the annular part in the circumferential direction around the longitudinal axis. Each second radial clearance allows the cold air contained in the intermediate annular chamber to circulate from upstream to downstream relative to the radial annular wall of the nozzle in order to head directly towards the downstream annular chamber.

The direct means of fluid communication between the intermediate annular chamber and the downstream annular chamber may comprise a plurality of downstream grooves of a second type formed on the downstream face of the radial annular wall, each downstream groove of the second type extending radially from the inner annular portion of the downstream face of the radial annular wall and leading radially outwards to one of the notches. Each downstream groove of the second type also allows cold air to circulate radially inwards towards the downstream annular chamber despite the annular attachment member and the downstream face of the radial annular wall resting against each other longitudinally and annularly.

Each downstream groove of the second type may have a rounded bottom. In particular, each downstream groove of the second type may have a crescent-shaped cross-section. Alternatively, each downstream groove of the second type may have a flat bottom. Each downstream groove of the second type may extend rectilinearly in a radial direction. Each upstream groove of the first type and each downstream groove of the first type may be respectively located on the upstream face and the downstream face of the radial annular wall of the nozzle, circumferentially between two circumferentially consecutive notches.

The assembly may comprise an annular seal housed in the intermediate annular chamber, the annular seal resting longitudinally against the first wall of the annular part and the radial annular wall of the nozzle, each upstream groove of the first type extending radially inwards to a first part of the inner annular portion of the upstream face of the radial annular wall, the first part of the inner annular portion delimiting a zone of the intermediate annular chamber located radially internally to the annular seal.

Each upstream groove of the first type thus allows air to circulate between the zone of the intermediate annular chamber located radially internally to the annular seal and a zone of the intermediate annular chamber located radially externally to the annular seal. In other words, a radially inner end of each upstream groove of the first type is radially located on the upstream face of the radial annular wall at a zone of the intermediate annular chamber which is located radially internally to the annular seal.

The cooling circuit may comprise a plurality of upstream grooves of a second type formed on the upstream face of the radial annular wall, each upstream groove of the second type extending radially from the first part of the inner annular portion of the upstream face of the radial annular wall to a second part of the inner annular portion of the upstream face of the radial annular wall, the second part of the inner annular portion delimiting a zone of the intermediate annular chamber located radially externally to the annular seal.

Each upstream groove of the second type also allows air to circulate between the zone of the intermediate annular chamber located radially internally to the annular seal and a zone of the intermediate annular chamber located radially externally to the annular seal. Each groove of the second type allows cold air to circulate radially outward in the intermediate annular chamber despite the seal which closes off the intermediate annular chamber.

In other words, a radially inner end of each upstream groove of the second type is radially located on the upstream face of the radial annular wall at the zone of the intermediate annular chamber which is located radially internally to the annular seal and a radially outer end of each upstream groove of the second type is radially located on the upstream face of the radial annular wall at a zone of the intermediate annular chamber which is located radially externally to the annular seal. Each upstream groove of the second type may extend rectilinearly in a radial direction. Each upstream groove of the second type may have a rounded bottom. In particular, each upstream groove of the second type may have a crescent-shaped cross-section. Alternatively, each upstream groove of the second type may have a flat bottom.

The outer casing may comprise a radial annular flange to which the annular part is fixed, the outer annular chamber being delimited radially externally, in whole or in part, by a radially inner end of the radial annular flange of the outer casing. The cold air thus allows cooling the radial annular flange of the outer casing, in particular cooling the radially inner end of the radial annular flange of the outer casing. The radial annular flange of the outer casing is therefore less subjected to high temperatures. Wear of the radial flange of the outer casing is limited or even avoided.

A turbine for a turbomachine of longitudinal axis is also proposed, comprising an assembly as described above. Also proposed is a turbomachine of longitudinal axis comprising such a turbine.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the invention.

Figure 1:
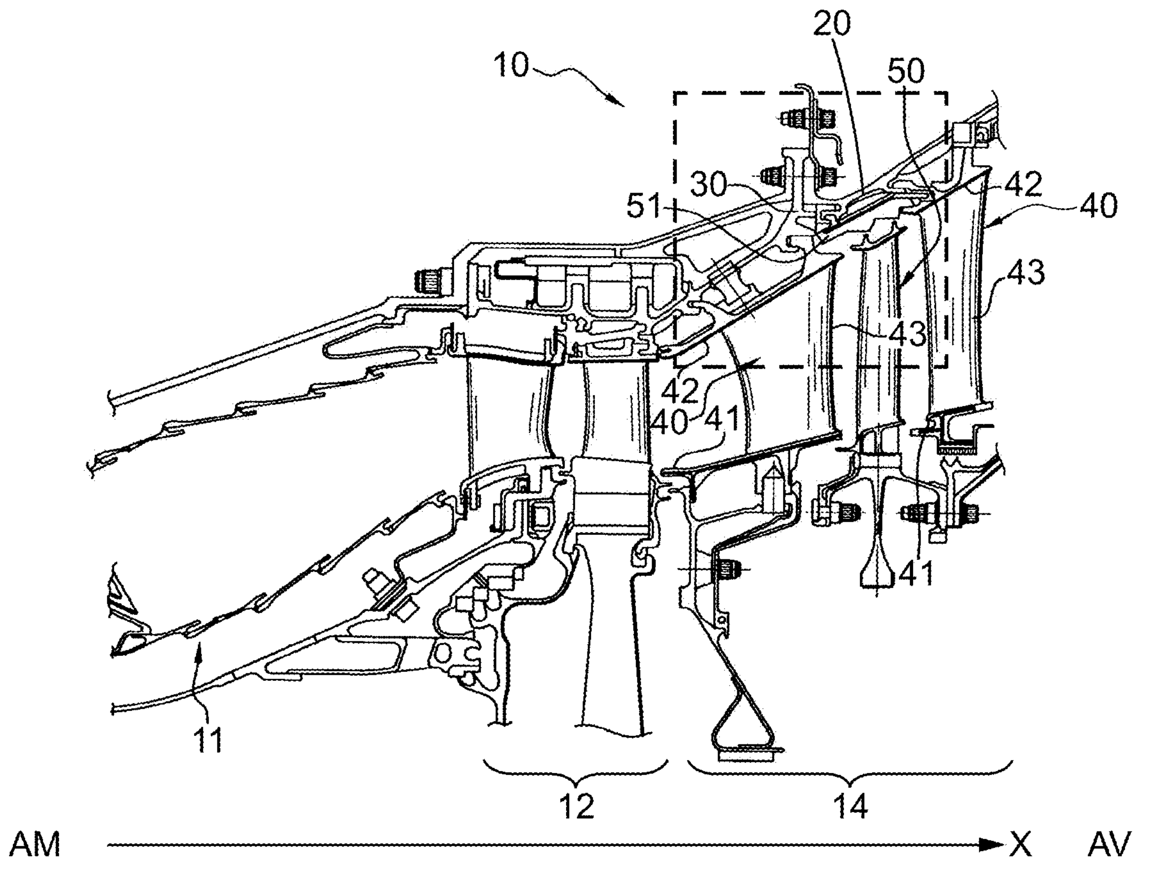
FIG. 1, already described above, is a partial sectional schematic view of a turbomachine of the prior art.
Figure 2:
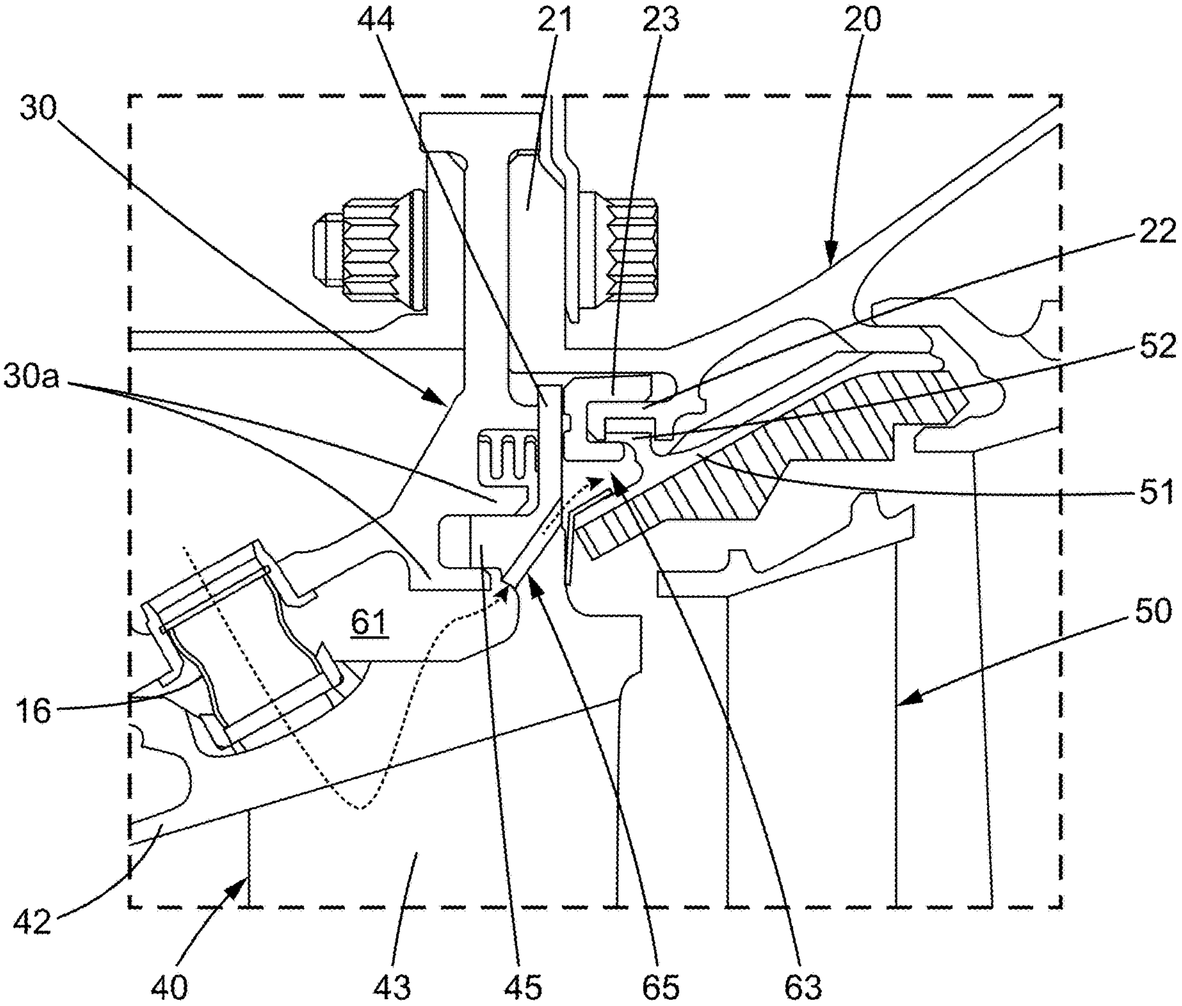
FIG. 2, already described above, is a partial sectional schematic view of an upstream stage of the low-pressure turbine of the turbomachine of FIG. 1.
Figure 3:
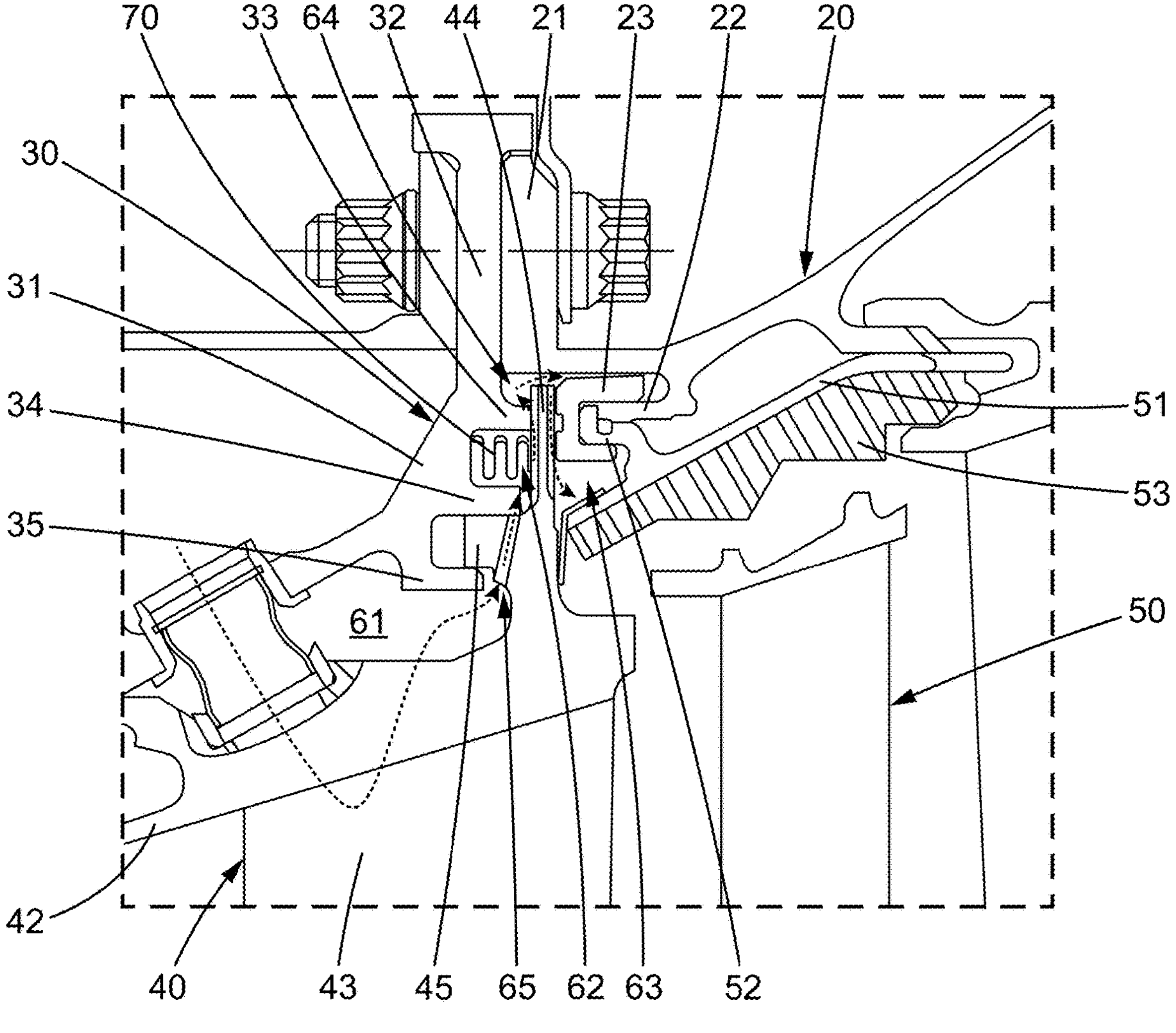
FIG. 3 is a partial sectional schematic view of an upstream stage of a low-pressure turbine of a turbomachine according to the present description, in a first section plane.
Figure 4:
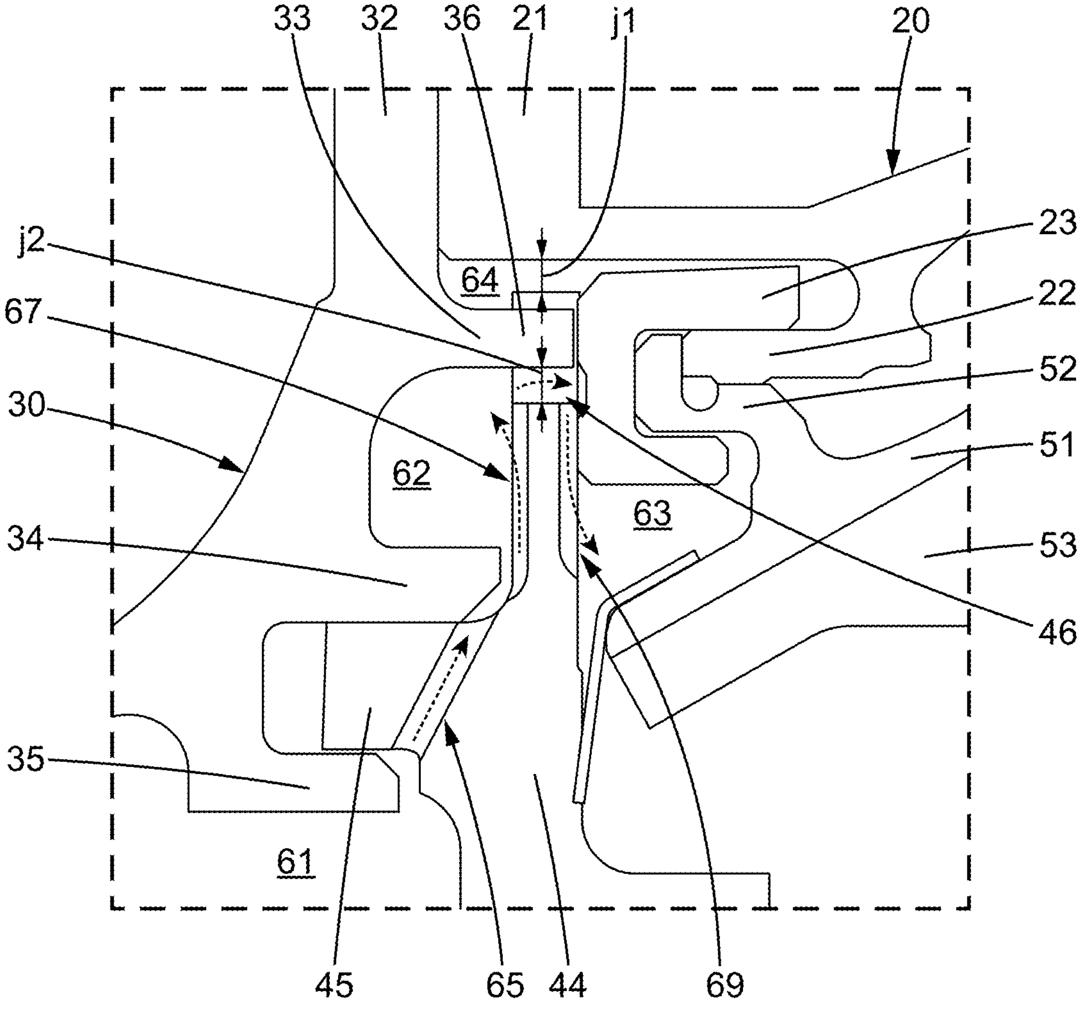
FIG. 4 is a partial sectional schematic view of the upstream stage of the low-pressure turbine of the turbomachine of FIG. 3, in a second section plane.

Reference is now made to FIGS. 3 and 4 which show part of an upstream stage of a low-pressure turbine 14 of a turbomachine of longitudinal axis X. The upstream stage comprises a nozzle 40 and an annular row of moving blades 50 arranged downstream of nozzle 40.

Figure 5:
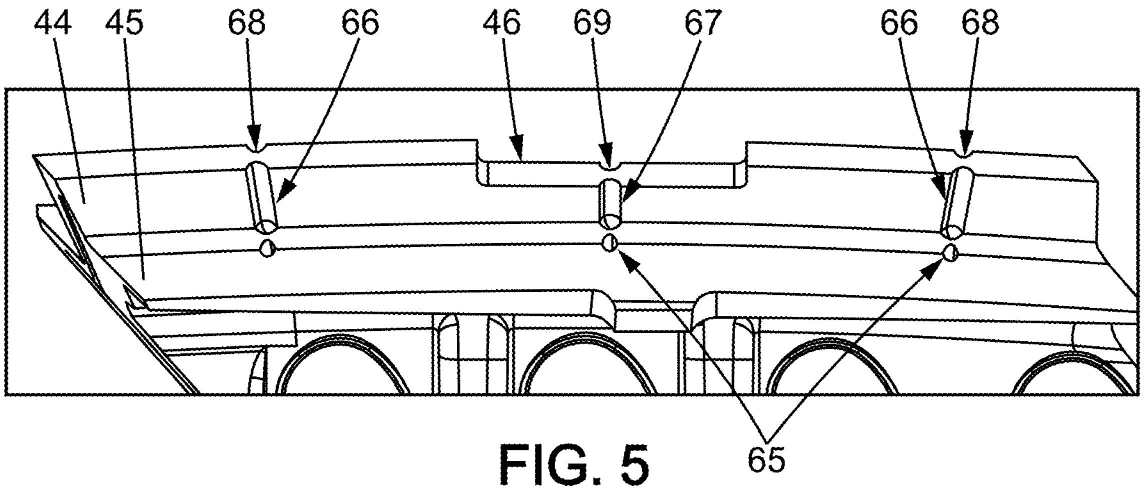
FIG. 5 is a first partial schematic perspective view of a nozzle of the upstream stage of the low-pressure turbine of the turbomachine of FIG. 3.
Figure 6:
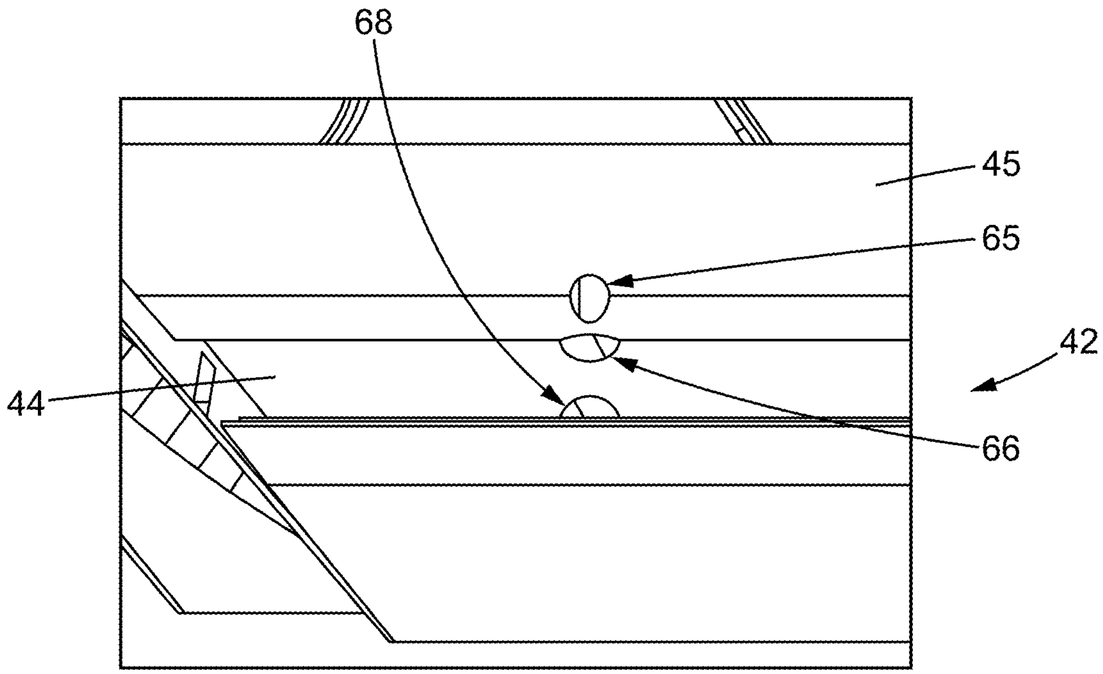
FIG. 6 is a second partial schematic perspective view of the nozzle of FIG. 5.

Nozzle 40, also visible in FIGS. 5 and 6, comprises an inner annular platform 41 and an outer annular platform 42 between which an annular row of fixed vanes 43 extends radially. Inner annular platform 41 and outer annular platform 42 radially define a flow path for gases in the turbine. Nozzle 40 is carried radially externally by an annular supporting part 30. For this purpose, nozzle 40 comprises a radial annular wall 44 which extends radially outwards from outer annular platform 42, in particular from a downstream portion of outer annular platform 42. Nozzle 40 further comprises an annular attachment tab 45 for attachment to annular part 30. Annular attachment tab 45 extends longitudinally upstream from radial annular wall 44. Annular attachment tab 45 may be an annular attachment tab 45 said to be "downstream". Nozzle 40 may comprise an upstream annular attachment tab (not shown) extending radially from an upstream portion of outer annular platform 42 and cooperating with annular part 30.

Annular part 30 comprises a first wall 31 which surrounds, here partly surrounds, nozzle 40. The first wall here extends in a direction comprising a radial component and a longitudinal component. In particular, the first wall is frustoconical with a cross-section that increases in the downstream direction. Annular part 30 comprises a radial annular flange 32 extending radially outwards from a downstream end of first wall 31 and by which annular part 30 is fixed to an outer casing 20 which surrounds the annular row of moving blades 50. Annular part 30 further comprises an outer cylindrical wall 33 and an intermediate cylindrical wall 34 each extending longitudinally downstream from first wall 31. Here, outer cylindrical wall 33 and intermediate cylindrical wall 34 are cylinders of revolution around the longitudinal axis X. Outer cylindrical wall 33 of annular part 30 surrounds, here partly surrounds, intermediate cylindrical wall 34. This part also comprises an inner cylindrical wall 35. Inner cylindrical wall 35 here is a cylinder of revolution around the longitudinal axis X. Inner cylindrical wall 35 is surrounded, here partly surrounded, by intermediate cylindrical wall 34 of annular part 30. According to the embodiment of FIGS. 3 and 4, annular part 30 comprises a radial annular wall extending radially inwards from first wall 31, from which inner cylindrical wall 35 extends longitudinally downstream. An upstream end portion of annular attachment tab 45 of nozzle 40 is clamped radially between intermediate cylindrical wall 34 and inner cylindrical wall 35 of annular part 30. Movement of nozzle 40 relative to annular part 30 is thus restricted in the radial direction.

As is more particularly visible in FIG. 5, radial annular wall 44 of nozzle 40 comprises a plurality of notches 46 distributed circumferentially around the longitudinal axis X. Each notch 46 is open radially outwards at a radially outer end of radial annular wall 44. Outer cylindrical wall 33 further comprises parts 36 projecting longitudinally downstream, which are each engaged in a respective notch 46 of radial annular wall 44 of nozzle 40. Movement of nozzle 40 relative to annular part 30 is thus restricted in the circumferential direction. Furthermore, between two circumferentially consecutive notches 46, outer cylindrical wall 33 rests in the longitudinal direction against an upstream face of radial annular wall 44 of nozzle 40.

Outer casing 20 is arranged downstream of annular part 30. Outer casing 20 is of annular shape. Outer casing 20 surrounds the annular row of moving blades 50. Outer casing 20 comprises a radial annular flange 21 to which annular part 30 is fixed. In particular, radial annular flange 21 of outer casing 20 and radial annular flange 32 of annular part 30 are fixed to each other. Outer casing 20 and annular part 30 are fixed here by bolting.

The annular row of moving blades 50 is surrounded by a ring 51 carried by outer casing 20. Ring 51 carries, on its radially inner face, an abradable material 53 intended to sealingly cooperate with lips extending radially outward from a radially outer end of each of the moving blades. Ring 51 is fixed, upstream, to outer casing 20 by means of an annular tab 52 resting radially against a cylindrical rail 22 of the casing, annular tab 52 and cylindrical rail 22 being held together by an annular attachment member 23. Annular attachment member 23 here has a C-shaped cross-section. The attachment member therefore forms an annular groove in which annular tab 52 and cylindrical rail 22 are radially clamped. It is noteworthy that annular attachment member 23 here rests longitudinally against an intermediate annular portion of the downstream face of radial annular wall 44 of nozzle 40.

A cooling circuit is also provided. The cooling circuit firstly comprises ducts adapted to bring cooling air, also called "cold air", bled from upstream, for example from a compressor of the turbomachine, to the internal cavities of the vanes of nozzle 40. The vanes of nozzle 40 are thus cooled.

The cooling circuit comprises an inner annular chamber 61, delimited radially by outer annular platform 42 internally and annular part 30 externally, and delimited downstream by radial annular wall 44. In particular, the inner annular chamber is delimited radially externally in part by first wall 31 of annular part 30. Inner annular chamber 61 may be delimited longitudinally upstream by an upstream attachment tab of nozzle 40. Inner annular chamber 61 is supplied with cold air. To do so, the cooling circuit may comprise means of fluid communication between the internal cavities of the vanes of nozzle 40 and inner annular chamber 61, in order to convey cold air into inner annular chamber 61. The means of fluid communication between the internal cavities of the vanes of nozzle 40 and inner annular chamber 61 may comprise a plurality of holes through outer annular platform 42, each leading radially inwards into an internal cavity of one of the vanes and leading radially outwards into inner annular chamber 61.

The cooling circuit comprises an intermediate annular chamber 62. Intermediate annular chamber 62 is delimited radially between intermediate cylindrical wall 34 of annular part 30 internally and outer cylindrical wall 33 of annular part 30 externally. Intermediate annular chamber 62 is delimited longitudinally between first wall 31 of annular part 30 upstream, and radial annular wall 44 of nozzle 40 downstream. Intermediate annular chamber 62 is therefore formed radially externally to annular attachment tab 45. Intermediate annular chamber 62 is also formed longitudinally upstream of radial annular wall 44 of nozzle 40. Intermediate annular chamber 62 is also supplied with cold air. To do so, the cooling circuit comprises means of fluid communication between inner annular chamber 61 and intermediate annular chamber 62, which are formed in annular attachment tab 45 of nozzle 40. Cold air may thus circulate in the cooling circuit from inner annular chamber 61 to intermediate annular chamber 62.

The means of fluid communication between inner annular chamber 61 and intermediate annular chamber 62 comprise a plurality of holes 65 formed through annular attachment tab 45. Each of holes 65 formed through the annular attachment tab extends in a direction contained in a respective radial plane. As can be seen in FIG. 4, each hole 65 extends in a direction comprising a component in the longitudinal direction and a component in the radial direction. Also, the inner end of each hole 65 (i.e. the end of the hole 65 that leads to an inner face of the corresponding annular attachment tab 45) is located upstream in the longitudinal direction relative to the outer end of hole 65 (i.e. the end of hole 65 that leads to an outer face of the corresponding annular attachment tab 45). In particular, for each hole 65, an external distance d_e in the longitudinal direction between the outer end of hole 65 and an upstream end of annular attachment tab 45 is greater than an internal distance d_i in the longitudinal direction between the inner end of hole 65 and the upstream end of annular attachment tab 45. More particularly, the ratio between internal distance d_i and external distance d_e may be between 1 and 2, preferably equal to 1.5. However, this does not exclude an embodiment in which each hole 65 extends radially (i.e. in a direction comprising only a radial component). In this case, the ratio between internal distance d_i and external distance d_e may be equal to 1.

Such holes 65 allow circulation of cold air between inner annular chamber 61 and intermediate annular chamber 62 via the shortest path. As can be seen in FIG. 5, holes 65 formed through annular attachment tab 45 are regularly distributed around the longitudinal axis. This allows a regular distribution of the flow of cold air circulating between inner annular chamber 61 and intermediate annular chamber 62.

Furthermore, each hole 65 leads radially internally into a first annular space formed longitudinally between a downstream end of inner cylindrical wall 35 of annular part 30 and radial annular wall 44 of nozzle 40. Similarly, each hole 65 leads radially outwards into a second annular space formed longitudinally between a downstream end of intermediate cylindrical wall 34 of annular part 30 and radial annular wall 44 of nozzle 40. The first annular space and the second annular space are in fluid communication respectively with inner annular chamber 61 and intermediate annular chamber 62. As a result, each hole 65 is formed through a portion of attachment tab 45 which is located longitudinally in the vicinity of radial annular wall 44. Thus, the means of fluid communication between inner annular chamber 61 and intermediate annular chamber 62 are devoid of holes 65 through intermediate cylindrical wall 34 and inner cylindrical wall 35 of annular part 30. In other words, the means of fluid communication between inner annular chamber 61 and intermediate annular chamber 62 as described do not require structural modification of annular part 30. Also, the means of fluid communication between inner annular chamber 61 and intermediate annular chamber 62 as described do not modify the arrangement for securing together nozzle 40 and annular part 30.

The cooling circuit comprises a downstream annular chamber 63. Downstream annular chamber 63 is delimited radially between ring 51 internally and annular attachment member 23 externally. Downstream annular chamber 63 is delimited longitudinally between radial annular wall 44 of nozzle 40 upstream, and annular tab 52 of ring 51 downstream. Downstream annular chamber 63 is also supplied with cold air. To do so, the cooling circuit comprises means of fluid communication between intermediate annular chamber 62 and downstream annular chamber 63. Cold air may thus be brought into downstream annular chamber 63 from intermediate annular chamber 62, enabling the cooling of annular tab 52 of ring 51, cylindrical rail 22 of outer casing 20, and annular attachment member 23.

In the embodiment shown in FIGS. 3 to 6, the means of fluid communication between intermediate annular chamber 62 and downstream annular chamber 63 comprise direct means of fluid communication between intermediate annular chamber 62 and downstream annular chamber 63 and indirect means of fluid communication between intermediate annular chamber 62 and downstream annular chamber 63.

The direct means of fluid communication between intermediate annular chamber 62 and downstream annular chamber 63 allow cold air to be brought directly into downstream annular chamber 63 from intermediate annular chamber 62, thus improving the cooling of annular tab 52 of ring 51, cylindrical rail 22 of outer casing 20, and annular attachment member 23.

The cooling circuit also comprises an outer annular chamber 64. Outer annular chamber 64 is delimited radially between outer cylindrical wall 33 of annular part 30 internally and outer casing 20 externally. Outer annular chamber 64 is delimited longitudinally between first wall 31 of annular part 30 upstream and radial annular wall 44 of nozzle 40 downstream. In particular, outer annular chamber 64 is delimited radially externally, here in part, by a radially inner end of radial annular flange 21 of outer casing 20.

The indirect means of fluid communication between intermediate annular chamber 62 and downstream annular chamber 63 comprise means of fluid communication between intermediate annular chamber 62 and outer annular chamber 64 and means of fluid communication between outer annular chamber 64 and downstream annular chamber 63. Outer annular chamber 64 is therefore also supplied with cold air. The cold air is brought to downstream annular chamber 63 to cool annular tab 52 of ring 51, cylindrical rail 22 of outer casing 20, and annular attachment member 23, after previously circulating in outer annular chamber 64 which also allows cooling outer casing 20, in particular radial annular flange 21 of outer casing 20, because the outer casing delimits outer annular chamber 64 radially externally. Wear of radial annular flange 21 of outer casing 20 due to high temperatures is therefore reduced or even avoided.

The means of fluid communication between intermediate annular chamber 62 and outer annular chamber 64 comprise a plurality of upstream grooves of a first type 66 formed on the upstream face of radial annular wall 44 of nozzle 40. Each upstream groove of the first type 66 is circumferentially located on the upstream face of radial annular wall 44 of nozzle 40, between two circumferentially consecutive notches 46. Each upstream groove of the first type 66 extends radially from an inner annular portion of the upstream face of radial annular wall 44 which delimits intermediate annular chamber 62, to an outer annular portion of the upstream face of radial annular wall 44 which delimits outer annular chamber 64. In other words, each upstream groove of the first type 66 extends, in the radial direction, from intermediate annular chamber 62 to outer annular chamber 64. Each upstream groove of the first type 66 is therefore adapted to provide a circulation of cold air between intermediate annular chamber 62 and outer annular chamber 64. Each upstream groove of the first type 66 here has a rounded bottom. Each upstream groove of the first type 66 thus has a crescent-shaped cross-section. Alternatively, it may be provided that each upstream groove of the first type 66 has a semicircular-shaped cross-section.

Each upstream groove of the first type 66 leads radially outwards to a radially outer end of radial annular wall 44. Each upstream groove of the first type 66 also has a radially inner end which is radially aligned with a radially outer mouth of one of holes 65 formed through annular attachment tab 45. This facilitates the circulation of cold air between one of holes 65 formed through annular attachment tab 45, and the associated upstream groove of the first type 66. Also, each upstream groove of the first type 66 extends rectilinearly in a respective radial direction. This allows circulation of cold air between intermediate annular chamber 62 and outer annular chamber 64 via the shortest path.

Furthermore, an annular seal 70 is provided, housed in intermediate annular chamber 62. Annular seal 70 is supported longitudinally between first wall 31 of annular part 30 and radial annular wall 44 of nozzle 40. In particular, annular seal 70 is here clamped longitudinally between first wall 31 of annular part 30 and radial annular wall 44 of nozzle 40. Annular seal 70 therefore forms a dividing wall in intermediate annular chamber 62. Annular seal 70 delimits, radially on either side, a zone of intermediate annular chamber 62 which is located radially internally to annular seal 70 and a zone of intermediate annular chamber 62 which is located radially externally to annular seal 70.

Each upstream groove of the first type 66 has a radially inner end located at the zone of intermediate annular chamber 62 which is located radially internally to annular seal 70. In particular, each upstream groove of the first type 66 extends, in the radial direction, from annular attachment tab 45 to the radially outer end of radial annular wall 44. This thus allows the circulation of cold air from the zone of intermediate annular chamber 62 radially internal to annular seal 70 towards the zone of intermediate annular chamber 62 radially external to annular seal 70 and finally towards outer annular chamber 64.

The cooling circuit also comprises a plurality of upstream grooves of a second type 67 formed on the upstream face of radial annular wall 44. Each upstream groove of the second type 67 extends, in the radial direction, from annular attachment tab 45 and leads radially outwards to one of notches 46. Each upstream groove of the second type 67 improves the circulation of cold air between the zone of intermediate annular chamber 62 radially internal to annular seal 70 and the zone of intermediate annular chamber 62 radially external to annular seal 70.

Each upstream groove of the second type 67 extends, rectilinearly here, in a radial direction. Each upstream groove of the second type 67 here also has a rounded bottom. Each upstream groove of the second type 67 also has a crescent-shaped cross-section. Alternatively, it may also be provided that each upstream groove of the second type 67 has a semicircular-shaped cross-section. Each upstream groove of the second type 67 also has a radially inner end which is radially aligned with a radially outer mouth of one of holes 65 formed through annular attachment tab 45. This facilitates the circulation of cold air between one of holes 65 formed through annular attachment tab 45 and the associated upstream groove of the second type 67.

The means of fluid communication between outer annular chamber 64 and downstream annular chamber 63 comprise a first radial clearance j1 formed between the radially outer end of radial annular wall 44 of nozzle 40 and outer casing 20. First radial clearance j1 allows the cold air contained in outer annular chamber 64 to circulate from upstream to downstream relative to radial annular wall 44 of nozzle 40.

The means of fluid communication between outer annular chamber 64 and downstream annular chamber 63 also comprise a plurality of downstream grooves of a first type 68 formed on the downstream face of radial annular wall 44. Each downstream groove of the first type 68 is circumferentially located on the downstream face of radial annular wall 44 of nozzle 40 between two circumferentially consecutive notches 46. Each downstream groove of the first type 68 extends radially from an inner annular portion of the downstream face of radial annular wall 44 which delimits downstream annular chamber 63 to an outer annular portion of the downstream face of radial annular wall 44 which is located radially externally to the intermediate annular portion of the downstream face of radial annular wall 44 against which the attachment member rests. In other words, each downstream groove of the first type 68 extends, in the radial direction, from downstream annular chamber 63 to the annular space formed at first radial clearance j1 which is formed between the radially outer end of radial annular wall 44 of nozzle 40 and outer casing 20. Each downstream groove of the first type 68 is therefore adapted to allow the circulation of cold air radially inwards towards downstream annular chamber 63 even if annular attachment member 23 is resting annularly and in the longitudinal direction against the downstream face of radial annular wall 44. Each downstream groove of the first type 68 here has a rounded bottom. Each downstream groove of the first type 68 thus has a crescent-shaped cross-section. Alternatively, it may be provided that each downstream groove of the first type 68 has a semicircular-shaped cross-section.

Each downstream groove of the first type 68 here leads radially outwards to a radially outer end of radial annular wall 44. Also, each downstream groove of the first type 68 extends rectilinearly in a respective radial direction. This allows circulation of cold air between outer annular chamber 64 and downstream annular chamber 63 via the shortest path. It is noteworthy that the radial direction of extension of each downstream groove of the first type 68 is angularly coincident around the longitudinal axis X with the radial direction of extension of one of the upstream grooves of the first type 66. In other words, the upstream grooves of the first type 66 and the downstream grooves of the first type 68 are formed as pairs of opposites, respectively on the upstream and downstream faces of radial annular wall 44 of nozzle 40.

The direct means of fluid communication between intermediate annular chamber 62 and downstream annular chamber 63 firstly comprise a second radial clearance j2 formed between, on the one hand, a bottom face of each notch 46 formed in radial annular wall 44 of nozzle 40, and on the other hand, the corresponding part 36 projecting from annular part 30. Second radial clearance j2 formed between the bottom face of each notch 46 and the corresponding part 36 projecting from annular part 30 is adapted to allow circulation of the cold air contained in intermediate annular chamber 62 from upstream to downstream relative to radial annular wall 44 of nozzle 40 in order to be brought directly into downstream annular chamber 63.

The direct means of fluid communication between intermediate annular chamber 62 and downstream annular chamber 63 here also comprise a plurality of downstream grooves of a second type 69 formed on the downstream face of radial annular wall 44. Each downstream groove of the second type 69 extends radially from the inner annular portion of the downstream face of the radial annular wall which delimits downstream annular chamber 63 and leads radially outwards to one of notches 46. Each downstream groove of the first type 68 is adapted to allow circulation of cold air from an annular space formed at second radial clearance j2 formed between the bottom face of one of notches 46 and the corresponding part 36 projecting from annular part 30 towards downstream annular chamber 63, even though annular attachment member 23 is annularly and longitudinally resting against the downstream face of radial annular wall 44 of nozzle 40.

Each downstream groove of the second type 69 extends rectilinearly in a respective radial direction. The radial direction of extension of each downstream groove of the second type 69 is also angularly coincident around the longitudinal axis X with the radial direction of extension of one of the upstream grooves of the second type 67. In other words, the upstream grooves of the second type 67 and the downstream grooves of the second type 69 are formed as pairs of opposites, respectively on the upstream and downstream faces of radial annular wall 44 of nozzle 40.

Each downstream groove of the second type 69 here also has a rounded bottom. Each downstream groove of the second type 69 also has a crescent-shaped cross-section. Alternatively, it may also be provided that each downstream groove of the second type 69 has a semicircular-shaped cross-section.

The designation of the annular chambers using the adjectives "inner", "intermediate", and "outer", results from a choice of wording that aims to distinguish the annular chambers from one another. Also, alternatively, one (or more) of the annular chambers may be designated by a respective numeric adjective (first annular chamber, second annular chamber, and third annular chamber, etc.), in any chosen order. In one particular example, inner annular chamber 61 may be designated as the "first annular chamber", intermediate annular chamber 62 may be designated as the "second annular chamber", and outer annular chamber 64 may be designated as the "third annular chamber".

The invention claimed is:

1. An assembly for a turbomachine of longitudinal axis, the assembly comprising a nozzle carried by an annular part which is fixed to an outer casing surrounding an annular row of moving blades arranged downstream of the nozzle, the nozzle comprising an outer annular platform from which a radial annular wall extends radially outwards, the annular part comprising a first wall extending in a direction comprising at least one radial component and an outer cylindrical wall extending longitudinally downstream from the first wall, the assembly further comprising a cooling circuit which comprises an intermediate annular chamber and an outer annular chamber each delimited longitudinally between the first wall of the annular part and the radial annular wall of the nozzle, the outer annular chamber being formed radially externally to the intermediate annular chamber, the outer cylindrical wall forming a partition radially between the outer annular chamber and the intermediate annular chamber, the outer annular chamber being further delimited, radially externally, by the outer casing, the cooling circuit comprising means of fluid communication between the intermediate annular chamber and the outer annular chamber, the outer cylindrical wall of the annular part resting, in the longitudinal direction, against an upstream face of the radial annular wall of the nozzle, the means of fluid communication between the intermediate annular chamber and the outer annular chamber comprising a plurality of upstream grooves of a first type formed on the upstream face of the radial annular wall, each upstream groove of the first type extending radially from an inner annular portion of the upstream face of the radial annular wall which delimits the intermediate annular chamber, to an outer annular portion of the upstream face of the radial annular wall which delimits the outer annular chamber.

2. The assembly according to claim 1, wherein each upstream groove of the first type lead radially outwards to a radially outer end of the radial annular wall.

3. The assembly according to claim 1, wherein each upstream groove of the first type have a rounded bottom.

4. The assembly according to claim 1, wherein the annular row of moving blades is surrounded by a ring carried by the outer casing, the ring being fixed, upstream, to the outer casing by means of an annular tab resting radially against a cylindrical rail of the outer casing, the annular tab and the cylindrical rail being held together by an annular attachment member, the cooling circuit comprising a downstream annular chamber delimited radially between the ring and the annular attachment member and delimited longitudinally between the radial annular wall of the nozzle and the annular tab of the ring, and means of fluid communication between the intermediate annular chamber and the downstream annular chamber.

5. The assembly according to claim 4, wherein the means of fluid communication between the intermediate annular chamber and the downstream annular chamber comprise indirect means of fluid communication between the intermediate annular chamber and the downstream annular chamber, via the outer annular chamber, the indirect means of fluid communication between the intermediate annular chamber and the downstream annular chamber comprising the means of fluid communication between the intermediate annular chamber and the outer annular chamber.

6. The assembly according to claim 5, wherein the indirect means of fluid communication between the intermediate annular chamber and the downstream annular chamber comprise means of fluid communication between the outer annular chamber and the downstream annular chamber.

7. The assembly according to claim 6, wherein the means of fluid communication between the outer annular chamber and the downstream annular chamber comprise a first radial clearance formed between a radially outer end of the radial annular wall of the nozzle and the outer casing.

8. The assembly according to claim 6, wherein the annular attachment member rests, in the longitudinal direction, against an intermediate annular portion of a downstream face of the radial annular wall of the nozzle, the means of fluid communication between the outer annular chamber and the downstream annular chamber comprising a plurality of downstream grooves of a first type formed on the downstream face of the radial annular wall, each downstream groove of the first type extending radially from an inner annular portion of the downstream face of the radial annular wall which delimits the downstream annular chamber to an outer annular portion of the downstream face of the radial annular wall which is located radially externally to the intermediate annular portion of the downstream face of the radial annular wall.

9. The assembly according to claim 8, wherein each downstream groove of the first type extends rectilinearly in a radial direction.

10. The assembly according to claim 4, wherein the means of fluid communication between the intermediate annular chamber and the downstream annular chamber comprise direct means of fluid communication between the intermediate annular chamber and the downstream annular chamber.

11. The assembly according to claim 10, wherein the radial annular wall of the nozzle comprises a plurality of notches distributed circumferentially around the longitudinal axis and open radially outwards at a radially outer end of the radial annular wall, in which are engaged parts projecting from the outer cylindrical wall of the annular part, the direct means of fluid communication between the intermediate annular chamber and the downstream annular chamber comprising a second radial clearance formed between a bottom face of each notch and the corresponding part projecting from the annular part.

12. The assembly according to claim 11, wherein the annular attachment member rests, in the longitudinal direction, against an intermediate annular portion of a downstream face of the radial annular wall of the nozzle, the means of fluid communication between the outer annular chamber and the downstream annular chamber comprising a plurality of downstream grooves of a first type formed on the downstream face of the radial annular wall, each downstream groove of the first type extending radially from an inner annular portion of the downstream face of the radial annular wall which delimits the downstream annular chamber to an outer annular portion of the downstream face of the radial annular wall which is located radially externally to the intermediate annular portion of the downstream face of the radial annular wall, and wherein the direct means of fluid communication between the intermediate annular chamber and the downstream annular chamber comprise a plurality of downstream grooves of a second type formed on the downstream face of the radial annular wall, each downstream groove of the second type extending radially from the inner annular portion of the downstream face of the radial annular wall and leading radially outwards to one of the notches.

13. The assembly according to claim 12, wherein each downstream groove of the second type have a rounded bottom.

14. The assembly according to claim 11, wherein the outer cylindrical wall of the annular part rests, in the longitudinal direction, against an upstream face of the radial annular wall of the nozzle, the means of fluid communication between the intermediate annular chamber and the outer annular chamber comprising a plurality of upstream grooves of a first type formed on the upstream face of the radial annular wall, each upstream groove of the first type extending radially from an inner annular portion of the upstream face of the radial annular wall which delimits the intermediate annular chamber, to an outer annular portion of the upstream face of the radial annular wall which delimits the outer annular chamber, and wherein the annular attachment member rests, in the longitudinal direction, against an intermediate annular portion of a downstream face of the radial annular wall of the nozzle, the means of fluid communication between the outer annular chamber and the downstream annular chamber comprising a plurality of downstream grooves of a first type formed on the downstream face of the radial annular wall, each downstream groove of the first type extending radially from an inner annular portion of the downstream face of the radial annular wall which delimits the downstream annular chamber to an outer annular portion of the downstream face of the radial annular wall which is located radially externally to the intermediate annular portion of the downstream face of the radial annular wall, and wherein each upstream groove of the first type and each downstream groove of the first type is respectively located on the upstream face and the downstream face of the radial annular wall of the nozzle, circumferentially between two circumferentially consecutive notches.

15. The assembly according to claim 1, comprising an annular seal housed in the intermediate annular chamber, the annular seal resting longitudinally against the first wall of the annular part and the radial annular wall of the nozzle, each upstream groove of the first type extending radially inwards to a first part of the inner annular portion of the upstream face of the radial annular wall, the first part of the inner annular portion delimiting a zone of the intermediate annular chamber located radially internally to the annular seal.

16. The assembly according to claim 15, wherein the cooling circuit comprises a plurality of upstream grooves of a second type formed on the upstream face of the radial annular wall, each upstream groove of the second type extending radially from the first part of the inner annular portion of the upstream face of the radial annular wall to a second part of the inner annular portion of the upstream face of the radial annular wall, the second part of the inner annular portion delimiting a zone of the intermediate annular chamber located radially externally to the annular seal.

17. An assembly for a turbomachine of longitudinal axis, the assembly comprising a nozzle carried by an annular part which is fixed to an outer casing surrounding an annular row of moving blades arranged downstream of the nozzle, the nozzle comprising an outer annular platform from which a radial annular wall extends radially outwards, the annular part comprising a first wall extending in a direction comprising at least one radial component and an outer cylindrical wall extending longitudinally downstream from the first wall, the assembly further comprising a cooling circuit which comprises an intermediate annular chamber and an outer annular chamber each delimited longitudinally between the first wall of the annular part and the radial annular wall of the nozzle, the outer annular chamber being formed radially externally to the intermediate annular chamber, the outer cylindrical wall forming a partition radially between the outer annular chamber and the intermediate annular chamber, the outer annular chamber being further delimited, radially externally, by the outer casing, the cooling circuit comprising means of fluid communication between the intermediate annular chamber and the outer annular chamber, wherein the outer casing comprises a radial annular flange to which the annular part is fixed, the outer annular chamber being delimited radially externally, in whole or in part, by a radially inner end of the radial annular flange of the outer casing.

* * * * *